United States Patent
Smith et al.

(10) Patent No.: US 10,703,509 B2
(45) Date of Patent: Jul. 7, 2020

(54) MAIN ROTOR BLADE CUFF BOND FIXTURE

(71) Applicant: Sikorsky Aircraft Corporation, Stratford, CT (US)

(72) Inventors: Scott Oren Smith, Bedford, TX (US); David Littlejohn, Haslet, TX (US); Sven Roy Lofstrom, Irving, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 581 days.

(21) Appl. No.: 15/232,235

(22) Filed: Aug. 9, 2016

(65) Prior Publication Data

US 2018/0044038 A1    Feb. 15, 2018

(51) Int. Cl.

| | |
|---|---|
| *B64F 5/10* | (2017.01) |
| *B64C 27/473* | (2006.01) |
| *B23Q 3/06* | (2006.01) |
| *B64C 27/48* | (2006.01) |
| *B23Q 3/00* | (2006.01) |

(52) U.S. Cl.
CPC .............. *B64F 5/10* (2017.01); *B23Q 3/00* (2013.01); *B23Q 3/06* (2013.01); *B23Q 3/062* (2013.01); *B23Q 3/064* (2013.01); *B64C 27/473* (2013.01); *B23Q 3/063* (2013.01); *B64C 27/48* (2013.01)

(58) Field of Classification Search
CPC ..... B64F 5/10; B64F 5/40; B25B 5/04; B25B 5/104; B25B 5/103; B23Q 3/00; B23Q 3/06; B23Q 3/061; B23Q 3/062; B23Q 3/063; B23Q 3/064; Y10T 29/53974; Y10T 29/53983; B62B 3/02; B62B 3/10; B62B 2202/67; B62B 2203/60; B62B 2204/02
See application file for complete search history.

(56) References Cited

U.S. PATENT DOCUMENTS

| | | | |
|---|---|---|---|
| 3,607,545 A | 9/1971 | Parsons et al. | |
| 4,034,591 A * | 7/1977 | Rothenberger | B21D 41/026 72/393 |
| 4,855,011 A | 8/1989 | Legge et al. | |
| 5,296,173 A * | 3/1994 | Dornan | B29C 73/34 264/315 |
| 5,862,576 A * | 1/1999 | Leahy | B29D 99/0028 29/23.51 |
| 9,138,971 B2 | 9/2015 | Jones | |

(Continued)

FOREIGN PATENT DOCUMENTS

EP         2301843 B1    3/2011

*Primary Examiner* — Orlando E Aviles
*Assistant Examiner* — Aaron R McConnell
(74) *Attorney, Agent, or Firm* — Cantor Colburn LLP (57) ABSTRACT

A bond fixture including a plurality of supports mounted about a surface. At least one of the plurality of supports includes a vertical member and a hand crank operable to adjust a position of the vertical member. A first fixture is disposed at an end of the bond fixture and is movable relative to the surface. The first fixture includes a base and a support extending from the base. A second fixture includes a first member and a second member movably coupled. A fastener extending between the first member and the second member controls relative movement of the first member and the second member to define an opening there between. Each of the first member and the second member includes a plate having a heater formed therein.

11 Claims, 13 Drawing Sheets

(56) References Cited

U.S. PATENT DOCUMENTS 9,144,944 B1 9/2015 White
2013/0168022 A1* 7/2013 Jones ................ B29C 70/46
　　　　　　　　　　　　　　　　　　　156/378
2017/0216996 A1* 8/2017 Costen ................ B25B 5/101

\* cited by examiner

MAIN ROTOR BLADE CUFF BOND FIXTURE

BACKGROUND OF THE INVENTION

Exemplary embodiments of the invention relate to a rotary-wing aircraft and, more particularly, to a bond fixture for use during the manufacture or repair of a rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the leading edge thereof, is selected to enhance rotor blade performance, for example to increase the hover and lift capabilities of the rotary-wing aircraft. Rotor blades are subjected to high stresses and strains resulting from aerodynamic forces developed during operation.

BRIEF DESCRIPTION OF THE INVENTION

According to one embodiment of the invention, a bond fixture including a plurality of supports mounted about a surface. At least one of the plurality of supports includes a vertical member and a hand crank operable to adjust a position of the vertical member. A first fixture is disposed at an end of the bond fixture and is movable relative to the surface. The first fixture includes a base and a support extending from the base. A second fixture includes a first member and a second member movably coupled. A fastener extending between the first member and the second member controls relative movement of the first member and the second member to define an opening there between. Each of the first member and the second member includes a plate having a heater formed therein.

In addition to one or more of the features described above, or as an alternative, in further embodiments a portion of a component is receivable in the opening between the first member and the second member. Each plate includes a plurality of openings substantially identical to a plurality of openings formed in the component.

In addition to one or more of the features described above, or as an alternative, in further embodiments the first member and the second member are pivotally coupled together to form a clamping mechanism.

In addition to one or more of the features described above, or as an alternative, in further embodiments at least one of the plurality of supports has a contour complementary to a portion of a component received therein.

In addition to one or more of the features described above, or as an alternative, in further embodiments operation of the hand crank is used to align an opening formed in a component with a corresponding opening in the first fixture.

In addition to one or more of the features described above, or as an alternative, in further embodiments the heat generated by the heater is uniform across the heater.

In addition to one or more of the features described above, or as an alternative, in further embodiments the heat generated by the heater varies across the heater.

In addition to one or more of the features described above, or as an alternative, in further embodiments comprising an expandable support including an actuating mechanism and a plurality of movable members, wherein operation of the actuating mechanism causes the movable members to move radially.

In addition to one or more of the features described above, or as an alternative, in further embodiments the expandable support is positionable within a hollow interior of a first end of a component, the expandable support and the second fixture cooperate to apply a pressure to one or more walls of the component.

In addition to one or more of the features described above, or as an alternative, in further embodiments the bond fixture is configured for use with a rotor blade.

In addition to one or more of the features described above, or as an alternative, in further embodiments the second fixture is configured to bond a blade cuff to a root end of the rotor blade.

According to another embodiment, a method of bonding a blade cuff to a rotor blade includes installing the blade cuff to a root end of the rotor blade, mounting the rotor blade within a plurality of supports, coupling the blade cuff to a first fixture, installing a second fixture about the blade cuff, and applying localized and constant heat and pressure to the blade cuff via the second fixture.

In addition to one or more of the features described above, or as an alternative, in further embodiments coupling the blade cuff to the first fixture includes adjusting a position of the rotor blade to align a blade cuff lug hole with a corresponding opening in the first fixture.

In addition to one or more of the features described above, or as an alternative, in further embodiments coupling the blade cuff to the first fixture includes installing at least one fastener through the opening in the first fixture and the blade cuff lug hole.

In addition to one or more of the features described above, or as an alternative, in further embodiments installing a second fixture about the blade cuff includes positioning a portion of the blade cuff downstream from the first fixture within an opening defined between a first member and a second member of the second fixture.

In addition to one or more of the features described above, or as an alternative, in further embodiments installing a second fixture about the blade cuff includes aligning the first member and the second member with the portion of the blade cuff such that a plurality of openings formed in the first member and the second member are concentric with a plurality of blade cuff alignment openings formed in the blade cuff.

In addition to one or more of the features described above, or as an alternative, in further embodiments comprising connecting a power source to the second fixture to apply heat to the blade cuff.

In addition to one or more of the features described above, or as an alternative, in further embodiments comprising installing an expandable support within a hollow interior of the blade cuff.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
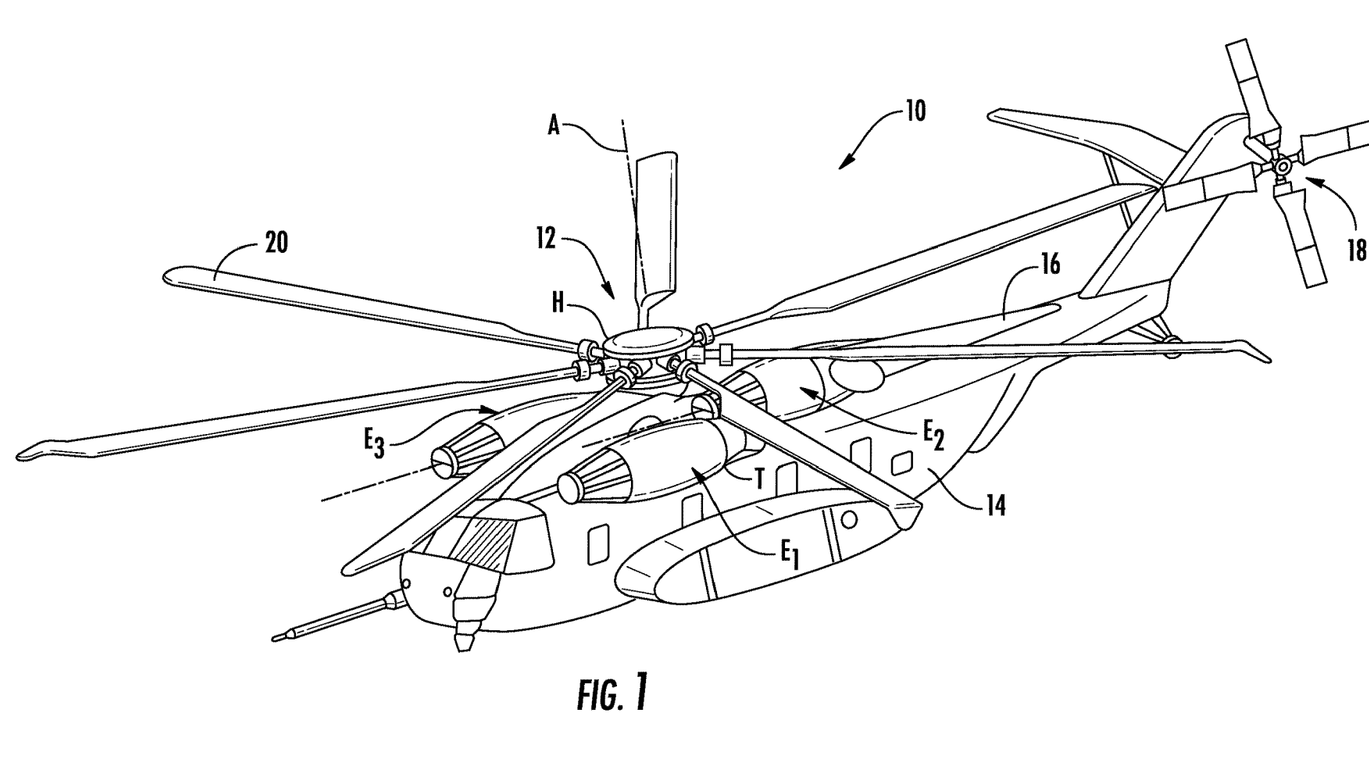
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
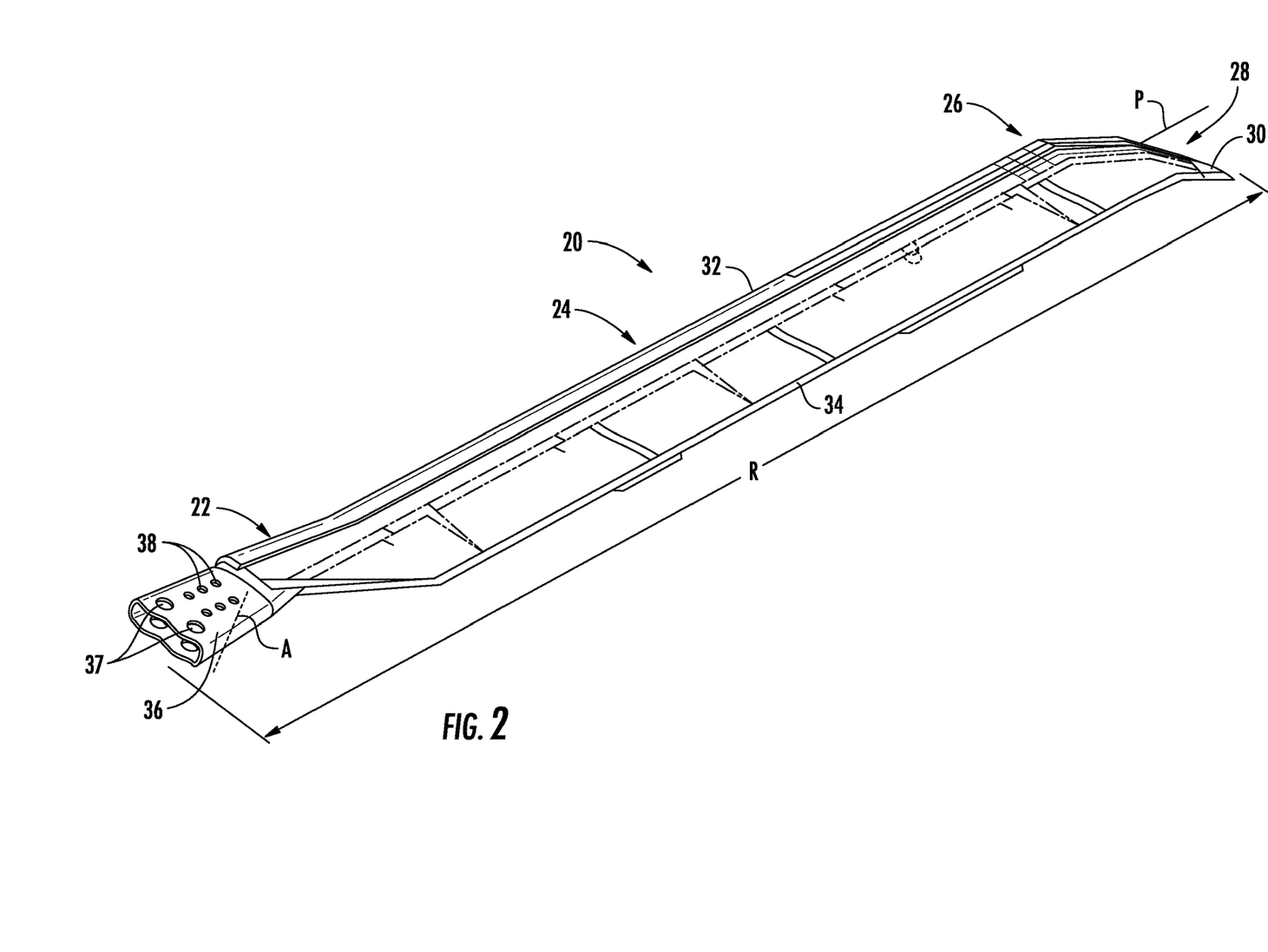
FIG. 2 is a perspective view of an example of a rotor blade of a rotary wing aircraft.
Figure 3:
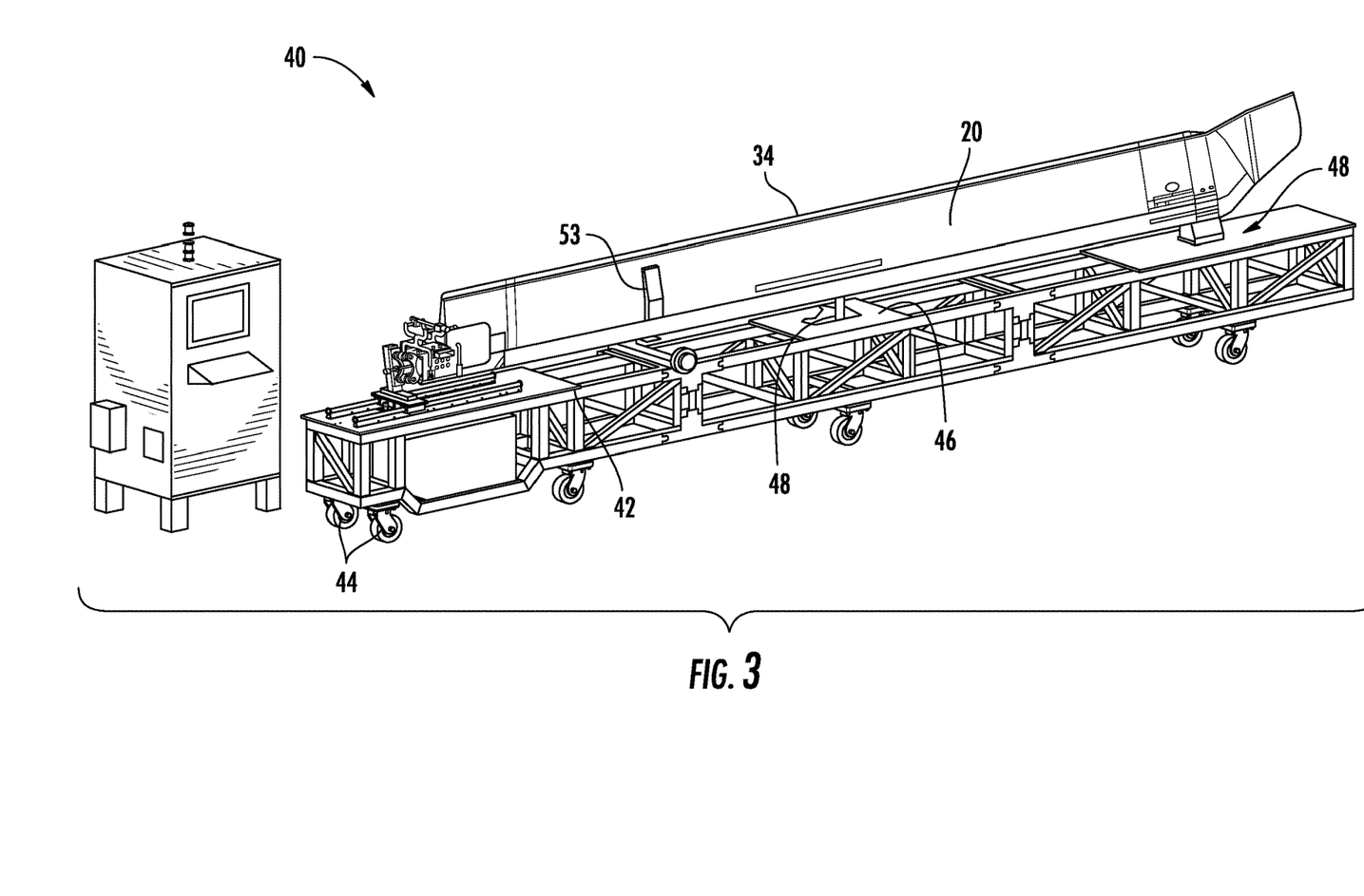
FIG. 3 is a side view of a bond assembly for bonding a blade cuff to a root end of a rotor blade according to an embodiment.
Figure 4:
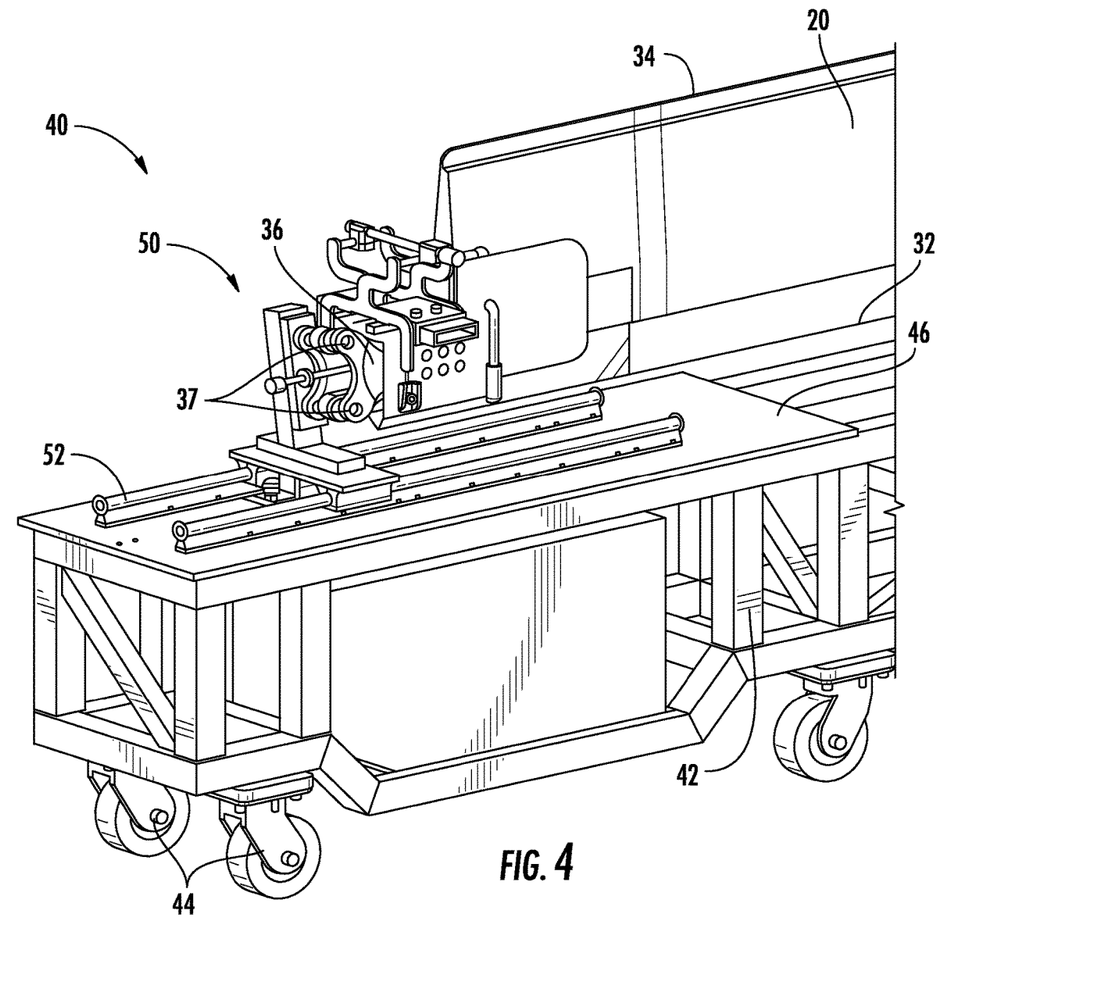
FIG. 4 is a detailed perspective view of a first fixture of a bond assembly for bonding a blade cuff to a root end of a rotor blade according to an embodiment.
Figure 5:
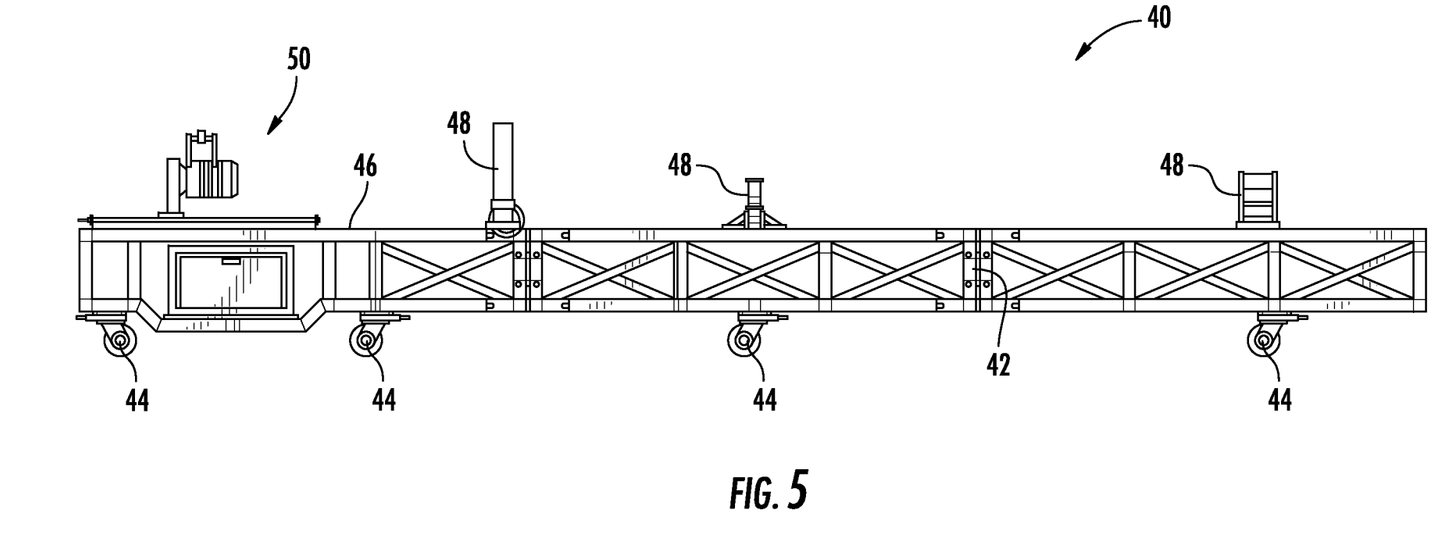
FIG. 5 is a side view of a portion of the bond assembly for bonding a blade cuff to a root end of a rotor blade according to an embodiment.

Referring to FIG. 2, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form (not shown); however, a tip section having any angled or non-angled form such as cathedral, gull, bent, and other non-straight forms are also contemplated herein.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length Cm. As shown in FIG. 2, a blade cuff 36 is attached to the root section 22 to facilitate mounting of the rotor blade assembly 20 to a rotor hub assembly H. The blade cuff 36 is typically a one-piece machined metallic member bonded to the rotor blade assembly 20; however other types of blade cuffs are within the scope of the disclosure. In the illustrated, non-limiting embodiment, the blade cuff 36 includes a plurality of cuff lug holes 37 and a plurality of cuff alignment holes 38.

With reference now to FIGS. 3-12, an example of a bonding assembly 40 for bonding the blade cuff 36 to the root section 22 of the rotor blade 20 is illustrated. As shown, the bond assembly 40 includes a table 42 having a plurality of feet 44 configured to rest on or couple to a floor with one or more fasteners (not shown). An upper surface 46 of the table 42 is arranged generally level to the floor, such as at an ergonomic height for example. The table 42 has a length generally equal to or greater than the length of the rotor blade 20.

One or more supports 48 for mounting or constraining the rotor blade 20 are disposed along the length of the table 42. In the illustrated, non-limiting embodiments, the plurality of supports 48 include at least one support 48 arranged at the intermediate section 24 and at least one support 48 located at the tip section 26. However, other arrangements of the supports are contemplated herein. A contour of the plurality of supports 48 may be generally complementary to the portion of the rotor blade 20 received therein. In an embodiment, at least one of the supports 48 is configured such that when the rotor blade 20 is located therein, the leading edge 32 of the rotor blade 20 is positioned closest to the upper surface 46 of the table 42.

Figure 6:
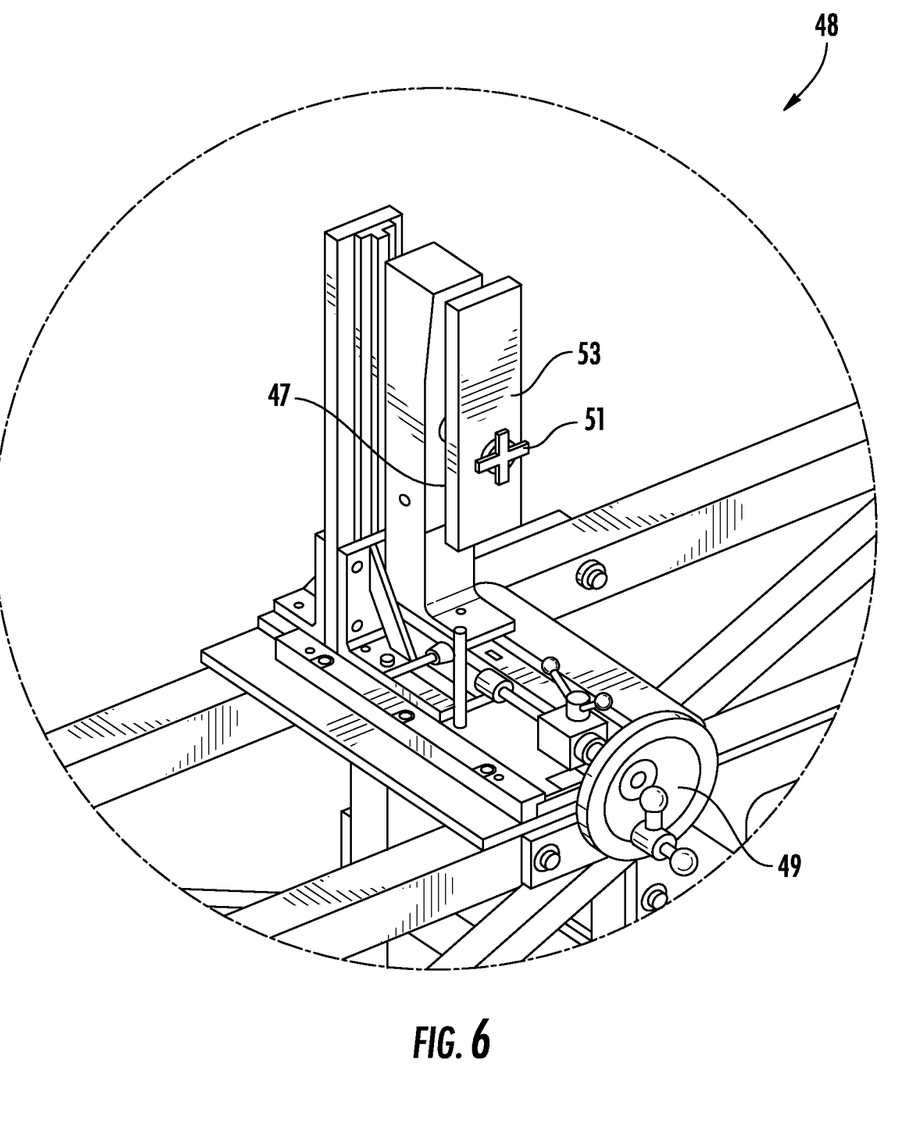
FIG. 6 is a perspective view of a support of the bond assembly according to an embodiment.

An example of a support 48 arranged at the intermediate section 24 of the rotor blade 20 is illustrated in more detail in FIG. 6. As shown, the support 48 includes a connector 47 operably coupled to a hand crank 49. Rotation of the hand crank 49 is configured to adjust a position of the connector 47 so that a hole 51 formed in the connector 47 may be substantially aligned with a blade tooling hole (not shown) on the rotor blade 20. A second connector 53 may be connected to both the rotor blade 20 and the support 48 via a fastener extending through the hole 51 and the hole in the rotor blade 20.

Figure 7:
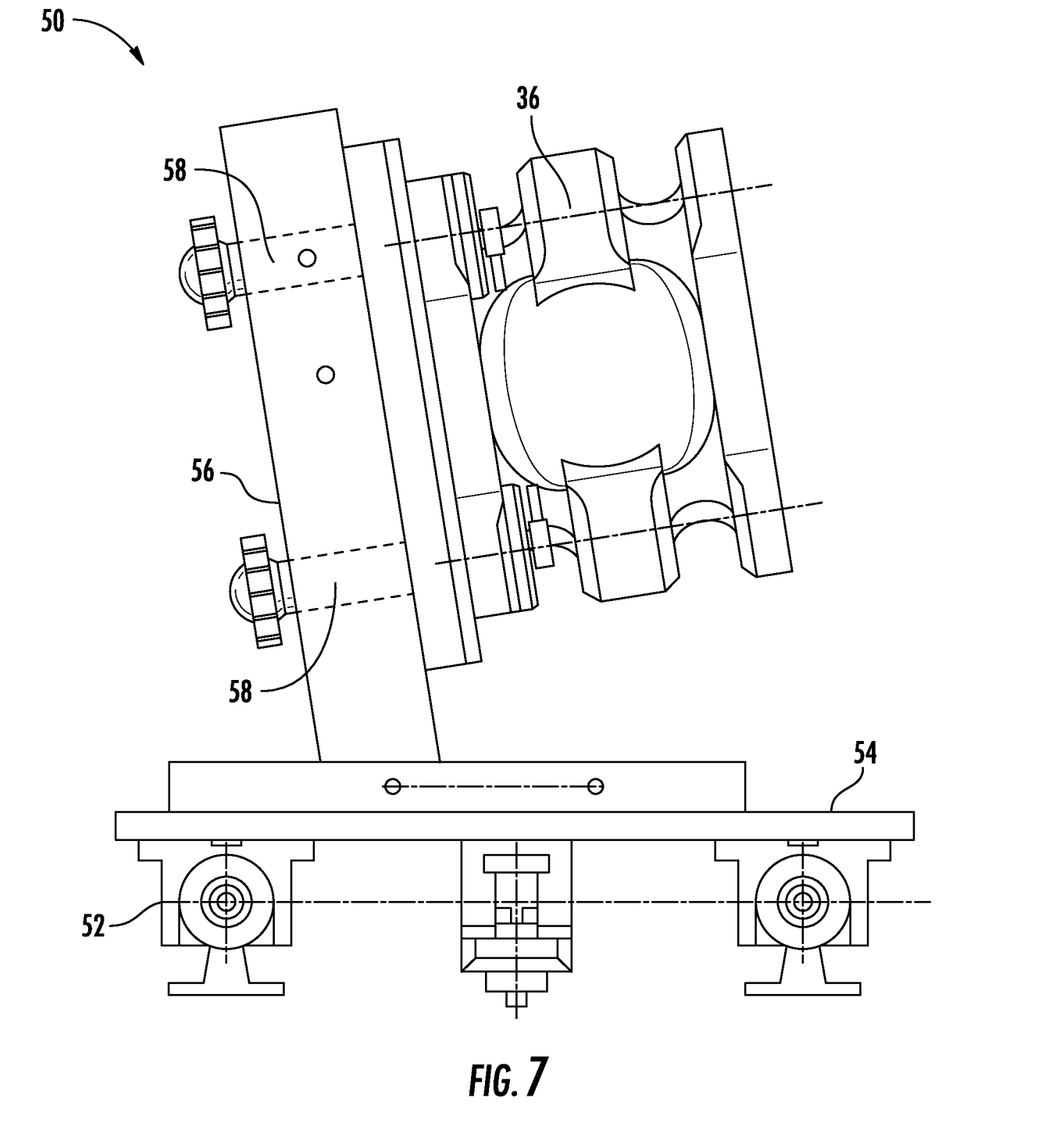
FIG. 7 is an end view of a first fixture of the bond assembly according to an embodiment.
Figure 8:
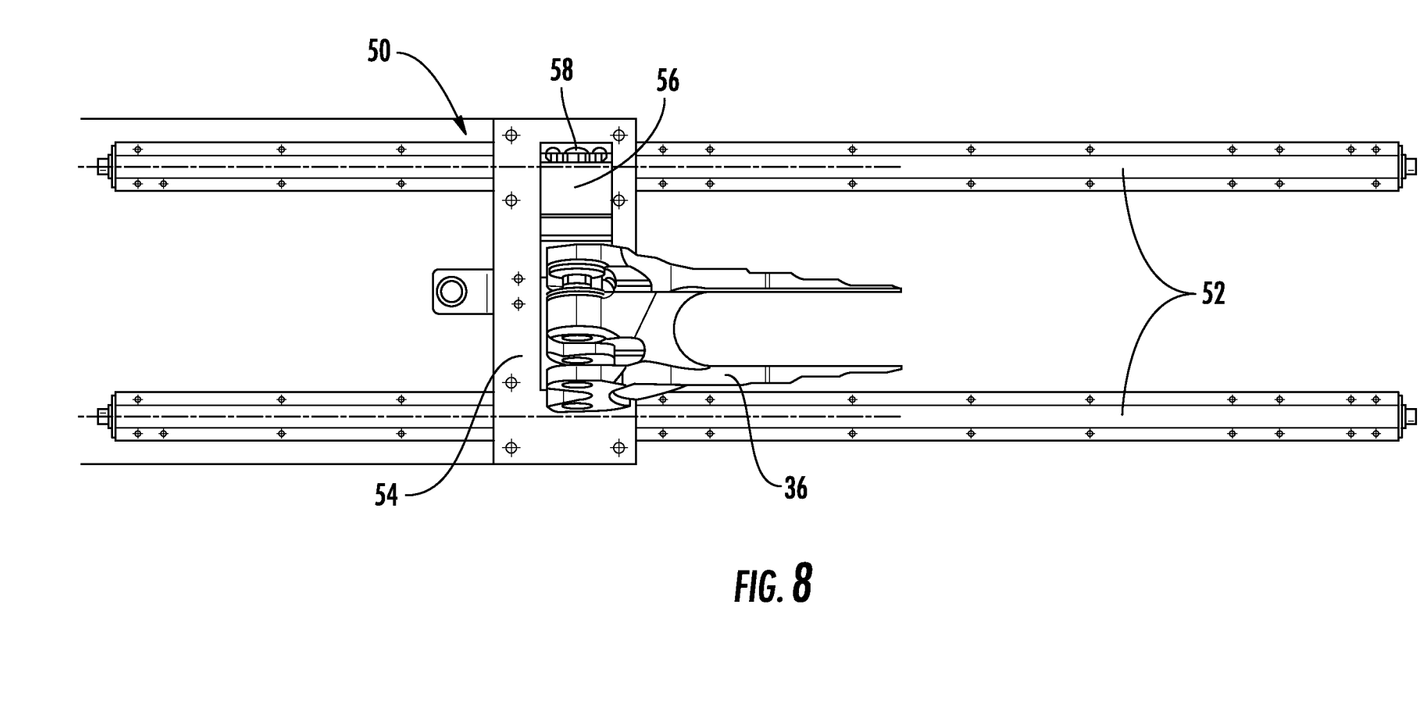
FIG. 8 is a top view of a first fixture of the bond assembly according to an embodiment.
Figure 9:
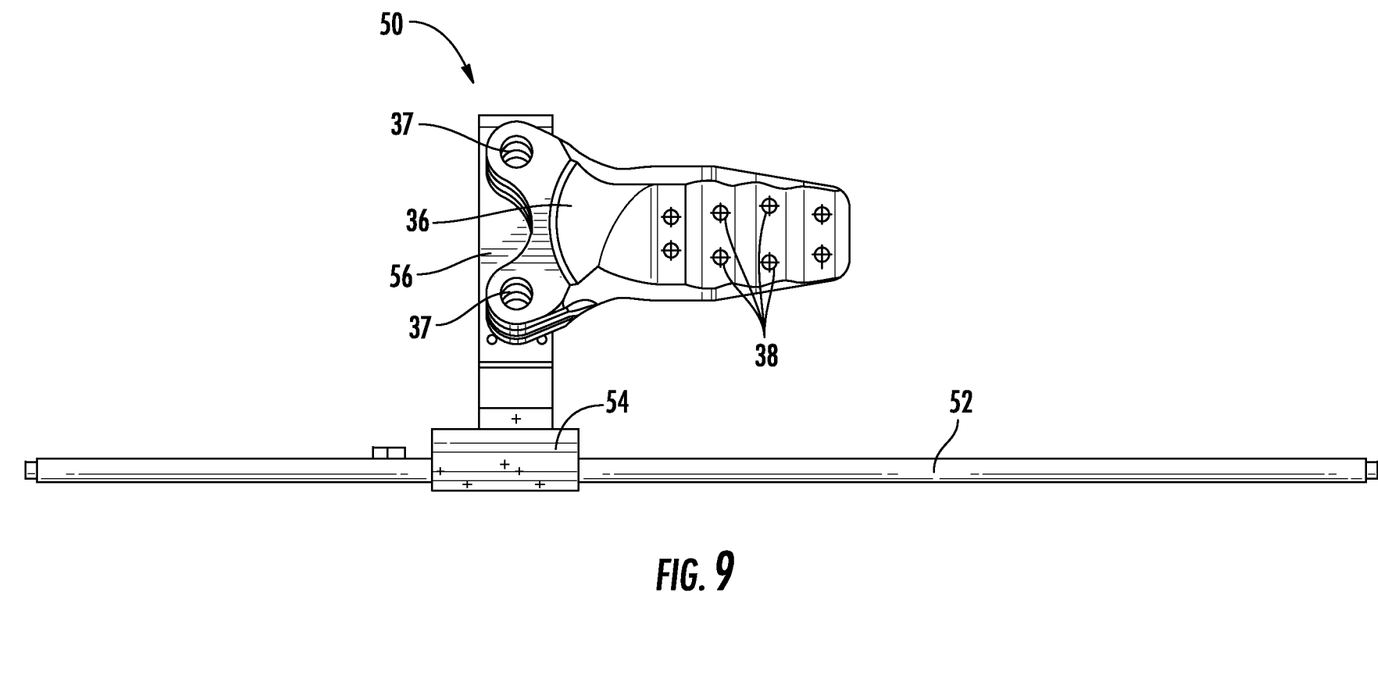
FIG. 9 is a side view of a first fixture of the bond assembly according to an embodiment.

With reference now to FIGS. 7-9, the bond assembly 40 includes a first fixture 50 for supporting the root section 22 of the rotor blade 20. In the illustrated, non-limiting embodiment, the first fixture 50 is movably mounted to the table 42, such that the fixture 50 is slidable along at least one linear track 52 (see FIG. 4) for example. The first fixture 50 includes a base 54 coupled to the track 52 and a generally vertically extending support 56 arranged at an angle relative to the base 54. The support 56 includes at least one hole 58 configured to align with the cuff lug holes formed in the blade cuff 36.

Figure 10:
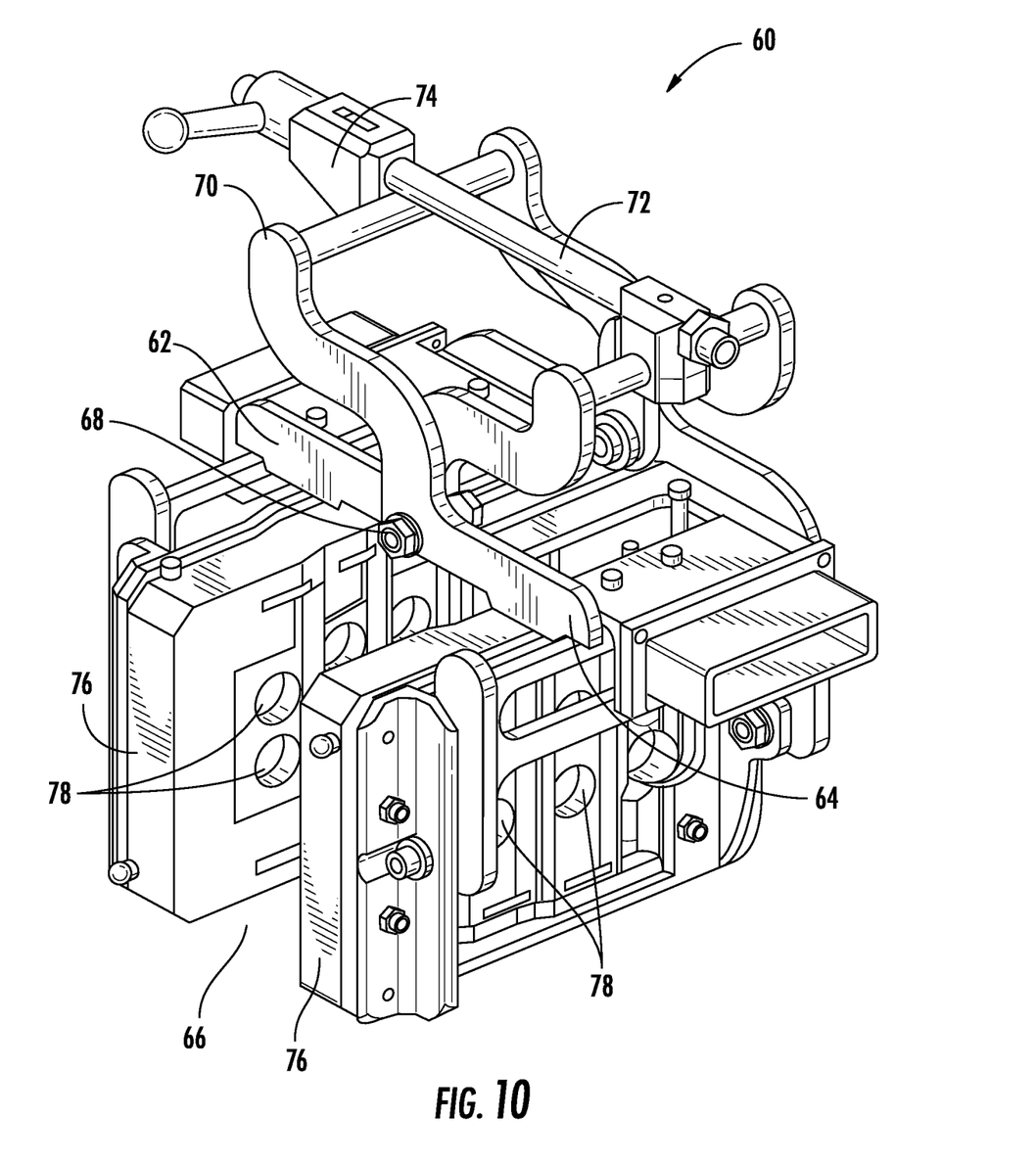
FIG. 10 is a perspective view of a second fixture of the bond assembly according to an embodiment.
Figure 11A:
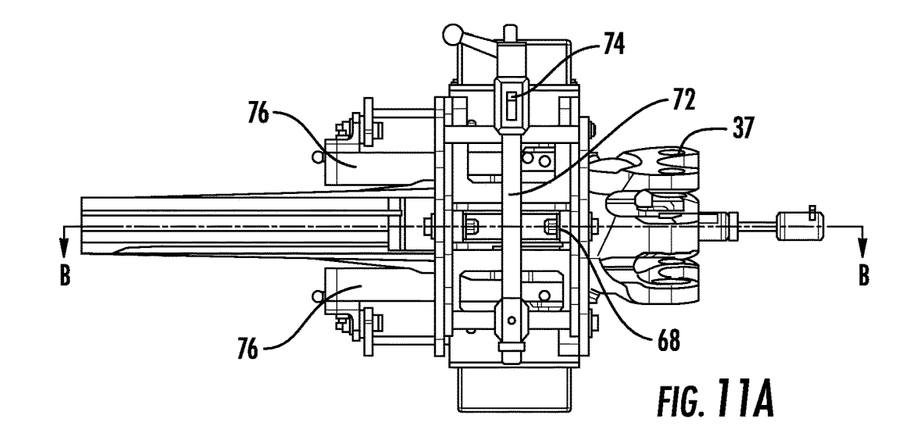
FIGS. 11a-11c are various views of the second fixture of the bond assembly positioned about a blade cuff according to an embodiment.
Figure 11B:
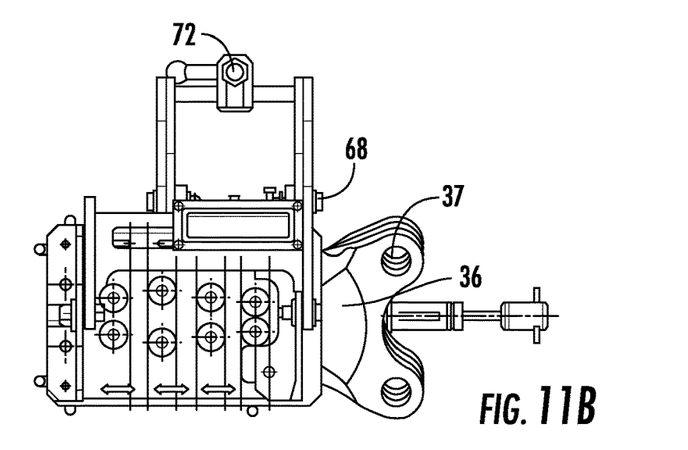
Figure 11C:
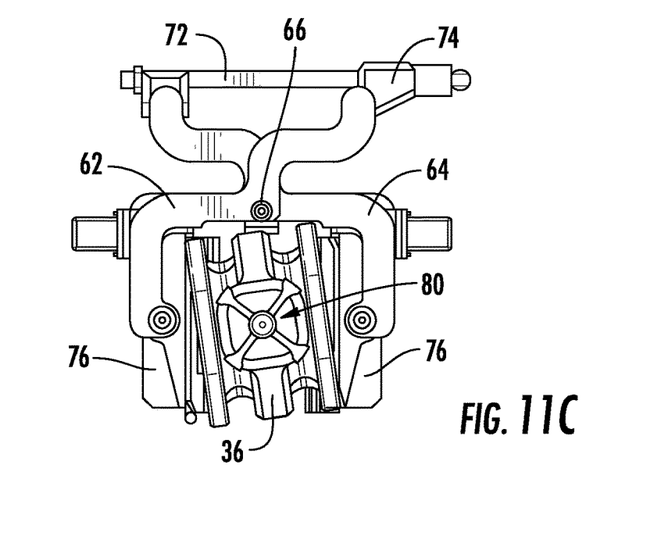

A second fixture 60 of the bond assembly 40 includes a scissor clamp mechanism having a first member 62 and a corresponding second member 64 pivotally mounted together about a pin 68. The scissor clamp mechanism 60 is generally shorter in length than the blade cuff 36 such that a portion of the blade cuff 36, such as downstream from the blade cuff lug holes 37 for example, is receivable within an opening 66 defined between the first member 62 and the second member 64.

The first and second members 62, 64 are configured to cooperate in a manner similar to a clamp or vice to grip the blade cuff 36. An upper end 70 of the first member 62 and the second member 64 is coupled via a fastener 72. Rotation of a corresponding nut 74 associated with the fastener 74 about an axis defined by the fastener 72 may be used to adjust the position of the first member 62 and the second member 64 relative to one another and therefore to the surface of the blade cuff 36. In an embodiment, the nut 74 is adjusted until a portion of the first and second member 62, 64 is in contact with and/or applying a pressure to the blade cuff 36.

The portion of each of the first member 62 and the second member 64 positioned directly adjacent the blade cuff 36 includes a plate 76 having a plurality of holes 78 formed therein. The holes 78 of the plates 76 are arranged in a pattern substantially identical to the pattern of cuff alignment holes 38 and may have a diameter equal to or greater than the cuff alignment holes 38. When the second fixture 60 is installed about the blade cuff 36, the pattern of holes 78 formed in each plate 76 is substantially aligned with the plurality of cuff alignment holes 38. In an embodiment, each plate 76 is a heater configured to thermally couple to the blade cuff 36 when power is supplied thereto. The heater may generate a substantially uniform or varied heat across its surface.

Figure 12:
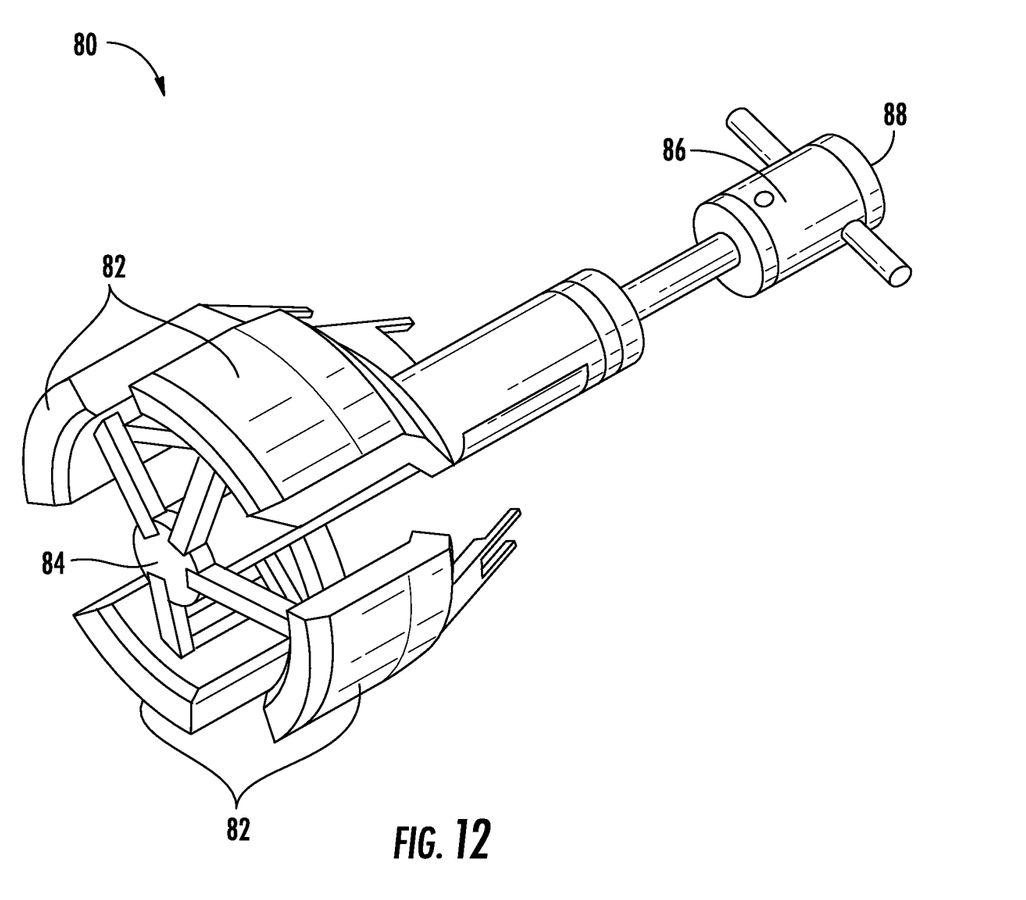
FIG. 12 is a perspective view of an expandable support for use with the bond assembly according to an embodiment.

An expandable support 80, best shown in FIG. 12, may be positioned within the hollow interior of the blade cuff 36. The support 80 includes a plurality of movable members 82 disposed at a first end 84 thereof. An actuating mechanism 86 is mounted at a second end 88 of the support 80. In the illustrated, non-limiting embodiment, rotation of the actuating mechanism 86 about an axis causes at least one of the plurality of movable members 82 to translate radially relative to the axis. When the expandable support 80 is positioned within the hollow interior of the blade cuff 36, the movable members 82 can be expanded to apply an outward force on the interior of the blade cuff 36. As a result, the scissor clamp mechanism 60 and the expandable support 80 cooperate to apply a clamping force to each sidewall of the blade cuff 36.

Figure 13:
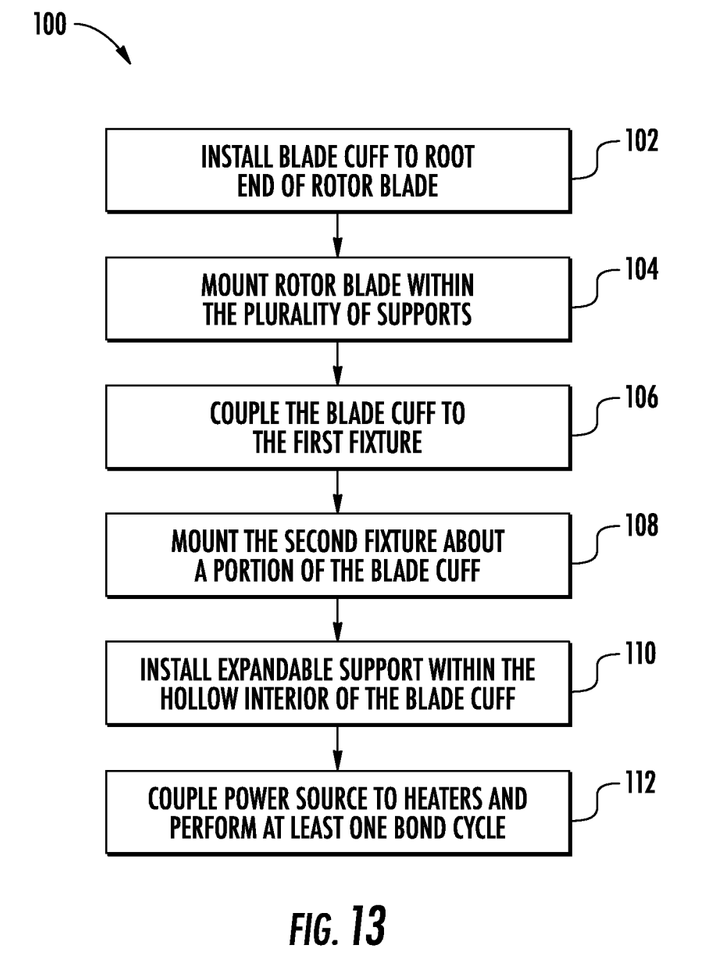
FIG. 13 is a schematic diagram of a method of bonding a blade cuff to the root end of a rotor blade according to an embodiment.

With reference now to FIG. 13, a method 100 of bonding the blade cuff 36 to the rotor blade assembly 20 includes installing the blade cuff 36 about the root end 22 of the rotor blade 20, as shown in block 102. In block 104, the rotor blade 20 is lowered into a position where a leading edge 32 of the rotor blade 20 is positioned within the plurality of supports 48. In an embodiment, mounting the rotor blade 20 within the plurality of supports 48 includes adjusting a hand crank 49 associated with one of the supports 48 arranged at the intermediate section 24 of the rotor blade to align a hole 47 formed in the support 48 with an adjacent hole formed in the rotor blade 20. A second connector 53 may be mounted to the rotor blade 20 and the support 48 via hole 51 to apply a clamping force to the rotor blade 20.

The blade cuff of the rotor blade 20 is then mounted within the first fixture 50, as shown in block 106, by inserting one or more fasteners through the blade cuff lug holes 37 and the corresponding holes 58 formed in the vertical support 56 of the first fixture 50. The hand crank 49 associated with one of the plurality of supports 48 may be operated to adjust a height of the rotor blade 20 to align the holes 38, 58. The rotor blade 20 is in proper alignment with the first fixture 50 once a plurality of cuff attachment bolts arranged within the plurality of cuff alignment holes 38 move freely. In block 108, the second fixture 60 is mounted about the blade cuff 36. Mounting the second fixture 60 about the blade cuff 36 includes moving the plates 76 into contact with the blade cuff 36 and aligning the pattern of holes 78 with the pattern of cuff alignment holes 38 such that the holes 78, 38 are concentric. The expandable support 80 is then installed within the hollow interior of the blade cuff 36, as shown in block 110. This installation of the expandable support includes rotating the actuator 86 of the support 80 to expand the movable members 82 inside the cuff while maintaining an orientation of the cuff. In block 112, at least one cable is connected to the bond assembly and one or more bond cycles are performed.

The bond assembly 40 illustrated and described herein provides localized heat and pressure to a desired area of the rotor blade. The small size of the tool allows the bonding process to be performed in a fixed location without requiring movement to a separate location to cure. As a result, the need for a large walk-in oven to cure components of the blade 20 is eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bond fixture comprising:
a plurality of supports mounted about a surface, wherein at least one of the plurality of supports includes a vertical member and a hand crank operable to adjust a position of the vertical member;
a first fixture disposed at an end of the bond fixture and being movable relative to the surface, the first fixture including a base with an upper surface and a support extending vertically from the upper surface of the base at a non-perpendicular angle to the upper surface;
one or more fasteners positionable within an opening formed in the support; and
a second fixture including a first member and a second member pivotally mounted via a pin, wherein a fastener extending between the first member and the second member at an angle to the pin controls relative rotation of the first member and the second member to define an opening there between, each of the first member and the second member includes a plate having a heater formed therein.

2. The bond fixture according to claim 1, wherein a portion of a component is receivable in the opening between the first member and the second member, and each plate includes a plurality of openings, the plurality of openings being substantially identical to a plurality of openings formed in the component.

3. The bond fixture according to claim 1, wherein at least one of the plurality of supports has a contour complementary to a portion of a component received therein.

4. The bond fixture according to claim 1, wherein operation of the hand crank is used to align an opening formed in a component with a corresponding opening in the first fixture.

5. The bond fixture according to claim 1, wherein heat generated by the heater is uniform across the heater.

6. The bond fixture according to claim 1, wherein heat generated by the heater varies across the heater.

7. The bond fixture according to claim 1, further comprising an expandable support including an actuating mechanism and a plurality of movable members, wherein operation of the actuating mechanism causes the movable members to move radially.

8. The bond fixture according to claim 7, wherein the expandable support is positionable within a hollow interior of a first end of a component, the expandable support and the second fixture cooperate to apply a pressure to one or more walls of the component.

9. The bond fixture according to claim 1, wherein the bond fixture is configured for use with a rotor blade.

10. The bond fixture according to claim 9, wherein the second fixture is configured to bond a blade cuff to a root end of the rotor blade.

11. A bond fixture comprising:
- a plurality of supports mounted about a surface, wherein at least one of the plurality of supports includes a vertical member and a hand crank operable to adjust a position of the vertical member;
- a first fixture disposed at an end of the bond fixture and being movable relative to the surface, the first fixture including a base with an upper surface and a support extending vertically from the upper surface of the base at a non-perpendicular angle to the upper surface;
- one or more fasteners positionable within an opening formed in the support; and
- a second fixture including a first member and a second member pivotally mounted via a pin, wherein a fastener extending between the first member and the second member at an angle to the pin controls relative rotation of the first member and the second member to define an opening there between, each of the first member and the second member includes a plate having a heater formed therein, wherein the bond fixture is operable to bond a blade cuff to a rotor blade by applying localized and constant heat and pressure to the blade cuff via the second fixture.

* * * * *